United States Patent
Kitamura et al.

(10) Patent No.: US 10,550,246 B2
(45) Date of Patent: Feb. 4, 2020

(54) RUBBER COMPOSITION FOR TIRE, AND PNEUMATIC TIRE

(71) Applicant: SUMITOMO RUBBER INDUSTRIES, LTD., Kobe-shi, Hyogo (JP)

(72) Inventors: Naoya Kitamura, Kobe (JP); Ryuichi Tokimune, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 44 days.

(21) Appl. No.: 15/529,879

(22) PCT Filed: Nov. 11, 2015

(86) PCT No.: PCT/JP2015/081682
§ 371 (c)(1),
(2) Date: May 25, 2017

(87) PCT Pub. No.: WO2016/093006
PCT Pub. Date: Jun. 16, 2016

(65) Prior Publication Data
US 2017/0260373 A1 Sep. 14, 2017

(30) Foreign Application Priority Data
Dec. 10, 2014 (JP) ................................ 2014-250111

(51) Int. Cl.
*C08L 7/00* (2006.01)
*C08L 9/00* (2006.01)
(Continued)

(52) U.S. Cl.
CPC .............. *C08L 7/00* (2013.01); *B60C 1/0025* (2013.01); *C08K 3/04* (2013.01); *C08K 3/06* (2013.01); *C08K 3/22* (2013.01); *C08K 3/36* (2013.01); *C08K 5/09* (2013.01); *C08K 5/18* (2013.01); *C08K 5/47* (2013.01); *C08L 9/00* (2013.01);
(Continued)

(58) Field of Classification Search
CPC .. C08L 7/00; C08L 91/06; C08L 91/00; C08L 71/02; C08L 9/00; C08L 81/04; C08L 2205/035; C08L 2205/03; C08L 2205/025; C08K 3/04; C08K 3/36; C08K 5/18;
(Continued)

(56) References Cited
U.S. PATENT DOCUMENTS

2003/0111770 A1* 6/2003 Bohm .................. C08J 3/203
264/349
2007/0034311 A1* 2/2007 Brown .................. B60C 1/00
152/517
(Continued)

FOREIGN PATENT DOCUMENTS

CN 106133047 A 11/2016
CN 107001706 A 8/2017
(Continued)

OTHER PUBLICATIONS

Machine translation of JP-5-51491-A published Mar. 2, 1993.
(Continued)

*Primary Examiner* — Angela C Scott
(74) *Attorney, Agent, or Firm* — Birch, Stewart, Kolasch & Birch LLP

(57) ABSTRACT

Provided are: a rubber composition for tires that achieves a balanced improvement in handling stability, crack resistance, ozone resistance, discoloration resistance, tire appearance, fuel economy, tensile strength, and scorch resistance; and a pneumatic tire formed from the rubber composition. The invention relates to a rubber composition for tires containing: a rubber component having a combined content of polybutadiene rubber, natural rubber, and polyisoprene rubber of 90% by mass or more based on 100% by mass of the rubber component; sulfur; and at least one nonionic surfactant selected from the group consisting of a Pluronic nonionic surfactant, and a nonionic surfactant represented by the formula (1) below and/or a nonionic surfactant represented by the formula (2) below, the rubber composition containing, per 100 parts by mass of the rubber component, 2-70 parts by mass of carbon black and 1-5 parts by mass of silica, and being free of silane coupling agents, (1)

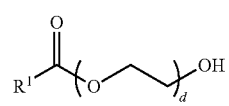

wherein $R^1$ represents a C6-C26 hydrocarbon group having an unsaturated bond, and d represents an integer, (2)

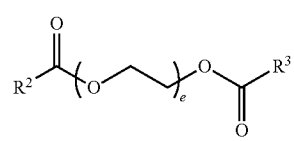

(Continued)

wherein $R^2$ and $R^3$ are the same or different and each represent a C6-C26 hydrocarbon group, and e represents an integer.

16 Claims, No Drawings

(51) Int. Cl.

| | | |
|---|---|---|
| C08K 5/09 | (2006.01) | |
| C08K 5/47 | (2006.01) | |
| C08K 3/04 | (2006.01) | |
| C08K 5/18 | (2006.01) | |
| C08L 71/02 | (2006.01) | |
| C08L 81/04 | (2006.01) | |
| C08K 3/36 | (2006.01) | |
| B60C 1/00 | (2006.01) | |
| C08L 91/06 | (2006.01) | |
| C08K 3/06 | (2006.01) | |
| C08K 3/22 | (2006.01) | |
| C08L 91/00 | (2006.01) | |

(52) U.S. Cl.
CPC ............ *C08L 71/02* (2013.01); *C08L 81/04* (2013.01); *C08L 91/00* (2013.01); *C08L 91/06* (2013.01); *B60C 2001/005* (2013.01); *C08L 2205/025* (2013.01); *C08L 2205/03* (2013.01); *C08L 2205/035* (2013.01)

(58) Field of Classification Search
CPC ... C08K 5/09; C08K 3/06; C08K 3/22; C08K 5/47; B60C 1/0025; B60C 2001/005

USPC .......................................................... 524/308
See application file for complete search history.

(56) References Cited

U.S. PATENT DOCUMENTS

| | | |
|---|---|---|
| 2013/0184387 A1 | 7/2013 | Tahara et al. |
| 2014/0202609 A1 | 7/2014 | Miyazaki |
| 2016/0177072 A1 | 6/2016 | Miyazaki et al. |
| 2017/0015812 A1 | 1/2017 | Miyazaki et al. |
| 2017/0306130 A1 | 10/2017 | Miyazaki |

FOREIGN PATENT DOCUMENTS

| | | | |
|---|---|---|---|
| JP | 63-213536 | A | 9/1988 |
| JP | 5-51491 | A | 3/1993 |
| JP | 5-194790 | A | 8/1993 |
| JP | 9-111039 | A | 4/1997 |
| JP | 2012-57153 | A | 3/2012 |
| WO | WO 2013/046804 | A1 | 4/2013 |
| WO | WO 2015/001935 | A1 | 1/2015 |

OTHER PUBLICATIONS

Machine translation of JP-63-213536-A published Sep. 6, 1988.
International Search Report, issued in PCT/JP2015/081682 (PCT/ISA/210), dated Feb. 16, 2016.
Written Opinion of the International Searching Authority, issued in PCT/JP2015/081682 (PCT/ISA/237), dated Feb. 16, 2016.

* cited by examiner

RUBBER COMPOSITION FOR TIRE, AND PNEUMATIC TIRE

TECHNICAL FIELD

The present invention relates to a rubber composition for tires and a pneumatic tire formed from the rubber composition.

BACKGROUND ART

Automobile tires, which are formed from rubber compositions containing natural rubber and synthetic diene rubbers as raw materials, can be degraded in the presence of ozone and eventually cracked. In order to reduce formation and growth of cracks in the presence of ozone, the rubber compositions contain additives, including, for example, antioxidants such as N-(1,3-dimethylbutyl)-N'-phenyl-p-phenylenediamine (6PPD) or poly(2,2,4-trimethyl-1,2-) dihydroquinoline (TMDQ), and petroleum-derived waxes.

The antioxidants and petroleum-derived waxes in rubber vulcanizates migrate (bloom) to the rubber surface of e.g. tires, thereby protecting the rubber from ozone. However, excessive blooming of the antioxidants and petroleum-derived waxes in short periods of time causes white discoloration. Moreover, the antioxidants degraded by ozone cause brown discoloration and similarly can excessively bloom, resulting in a more intense brown discoloration. In addition, if the waxes and other agents bloomed to the surface of a tire form surface irregularities, diffused reflection of light will occur, with the result that the brown discoloration caused by the degraded antioxidants may be more noticeable, and moreover the tire will lose its shine. Furthermore, tires are also required to ensure other properties such as fuel economy, tensile strength, and scorch resistance, as well as the appearance, crack resistance, and ozone resistance.

Patent Literature 1 discloses the incorporation of a polyoxyethylene ether nonionic surfactant to prevent deterioration of tire appearance. Nevertheless, there is room for improvement in terms of balanced improvement in handling stability, crack resistance, ozone resistance, discoloration resistance, tire appearance, fuel economy, tensile strength, and scorch resistance.

CITATION LIST

Patent Literature

Patent Literature 1: JP H05-194790 A

SUMMARY OF INVENTION

Technical Problem

The present invention aims to solve the above problems and provide a rubber composition for tires that achieves a balanced improvement in handling stability, crack resistance, ozone resistance, discoloration resistance, tire appearance, fuel economy, tensile strength, and scorch resistance, and also provide a pneumatic tire formed from the rubber composition.

Solution to Problem

The present invention relates to a rubber composition for tires, containing: a rubber component having a combined content of polybutadiene rubber, natural rubber, and polyisoprene rubber of 90% by mass or more based on 100% by mass of the rubber component; sulfur; and at least one nonionic surfactant selected from the group consisting of a Pluronic nonionic surfactant and at least one of nonionic surfactants represented by the formulas (1) and (2) below, the rubber composition containing, per 100 parts by mass of the rubber component, 2 to 70 parts by mass of carbon black and 1 to 5 parts by mass of silica, and being free of silane coupling agents,

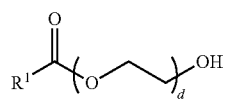

(1)

wherein $R^1$ represents a C6-C26 hydrocarbon group having an unsaturated bond, and d represents an integer,

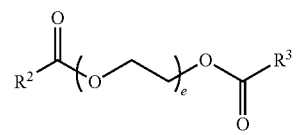

(2)

wherein $R^2$ and $R^3$ are the same or different and each represent a C6-C26 hydrocarbon group, and e represents an integer.

The rubber composition for tires preferably contains the nonionic surfactant in an amount of 0.1 to 5.0 parts by mass per 100 parts by mass of the rubber component.

The rubber composition for tires preferably contains the sulfur in an amount of 0.1 to 6.0 parts by mass per 100 parts by mass of the rubber component.

In the rubber composition for tires, the rubber component preferably includes the polybutadiene rubber in an amount of 30% by mass or more based on 100% by mass of the rubber component.

The rubber composition for tires is preferably for use as at least one of rubber compositions for sidewalls, clinches, or wings.

The present invention also relates to a pneumatic tire, including a tire component formed from the rubber composition.

The tire component is preferably at least one of a sidewall, a clinch, or a wing.

Advantageous Effects of Invention

The rubber composition for tires of the present invention contains: a rubber component having a combined content of polybutadiene rubber, natural rubber, and polyisoprene rubber of 90% by mass or more based on 100% by mass of the rubber component; sulfur; and at least one nonionic surfactant selected from the group consisting of a Pluronic nonionic surfactant, and a nonionic surfactant of formula (1) and/or a nonionic surfactant of formula (2). The rubber composition contains, per 100 parts by mass of the rubber component, 2 to 70 parts by mass of carbon black and 1 to 5 parts by mass of silica, but is free of silane coupling agents. Such a rubber composition can achieve a balanced improvement in handling stability, crack resistance, ozone resistance, discoloration resistance, tire appearance, fuel economy, tensile strength, and scorch resistance. Thus, the rubber composition can be used to provide a pneumatic tire excellent in the balance of these properties.

DESCRIPTION OF EMBODIMENTS

The rubber composition for tires of the present invention contains: a rubber component having a combined content of polybutadiene rubber, natural rubber, and polyisoprene rubber of 90% by mass or more based on 100% by mass of the rubber component; sulfur; and at least one nonionic surfactant selected from the group consisting of a Pluronic nonionic surfactant, and a nonionic surfactant of formula (1) and/or a nonionic surfactant of formula (2). The rubber composition contains, per 100 parts by mass of the rubber component, 2 to 70 parts by mass of carbon black and 1 to 5 parts by mass of silica, but is free of silane coupling agents.

First, in the present invention, by incorporating a specific nonionic surfactant into a rubber composition containing a specific rubber component and specific amounts of carbon black and sulfur, the irregularities formed on the tire surface (bloom layer) by blooming of waxes and other agents can be flattened to reduce diffused reflection of light. This also results in improved discoloration resistance, such as decreases in the brown discoloration and white discoloration described above. Furthermore, improved tire appearance is obtained, such as appropriate black appearance and shine imparted to the tire surface. At the same time, good handling stability, crack resistance, ozone resistance, and fuel economy are maintained or improved.

Further, probably since the rubber composition contains a specific nonionic surfactant, the compatibility of the rubber composition with the specific nonionic surfactant is appropriately controlled, thereby leading to a balanced improvement in handling stability, crack resistance, ozone resistance, tire appearance, discoloration resistance, and fuel economy as described above.

The incorporation of a specific nonionic surfactant provides the above-described effects but may reduce scorch time in the production, thereby causing rubber scorch. The present invention solves the new problem caused by the incorporation of a specific nonionic surfactant, by further using silica together with the specific nonionic surfactant without adding silane coupling agents. It is thus possible not only to reduce a decrease in scorch time but to improve tensile strength. Accordingly, the present invention can significantly improve the balance of handling stability, crack resistance, ozone resistance, discoloration resistance, tire appearance, fuel economy, tensile strength, and scorch resistance.

The rubber composition of the present invention contains at least one rubber selected from the group consisting of polybutadiene rubber (BR), natural rubber (NR), and polyisoprene rubber (IR). These may be used alone, or two or more of these may be used in combination. Particularly in view of handling stability, fuel economy, elongation at break, and durability, a combination of BR with NR and/or IR is preferably used.

The NR and IR may be those commonly used in the tire industry. Examples of the NR include SIR20, RSS#3, TSR20, TSR10, and TSS#8, and examples of the IR include IR2000. These may be used alone, or two or more of these may be used in combination.

The combined content of NR and IR based on 100% by mass of the rubber component is preferably 10% by mass or more, more preferably 30% by mass or more. The combined content is preferably 80% by mass or less, more preferably 70% by mass or less. When the combined content of NR and IR is within the range indicated above, the effects of the present invention can be more suitably achieved.

Any BR may be used including those commonly used in the tire industry. Examples include high-cis BR such as BR 1220 available from Zeon Corporation, and BR130B and BR150B both available from Ube Industries, Ltd.; BR containing 1,2-syndiotactic polybutadiene crystals (SPB) such as VCR412 and VCR617 both available from Ube Industries, Ltd.; and polybutadiene rubbers synthesized using rare earth catalysts (rare earth-catalyzed BR). Tin-modified polybutadiene rubbers (tin-modified BR) produced by modification with tin compounds can also be used. In particular, BR having a cis content of 95% by mass or more is preferred. Also preferred is a combination of SPB-containing BR and tin-modified BR.

In the case of SPB-containing BR, in view of abrasion resistance and extrusion processability, preferably the SPB crystals are not merely dispersed in BR but are chemically bonded to BR and dispersed therein. The SPB preferably has a melting point of 180° C. to 220° C. The SPB content of the SPB-containing BR is preferably 2.5% to 20% by mass. The SPB content of the SPB-containing BR refers to the amount of boiling n-hexane insolubles.

The tin-modified BR is produced by polymerization of 1,3-butadiene using a lithium initiator, followed by addition of a tin compound. Preferably, the tin-modified BR further has a tin-carbon bond at its molecular end.

Examples of the lithium initiator include lithium compounds such as alkyllithiums and aryllithiums. Examples of the tin compound include tin tetrachloride and butyltin trichloride. The tin-modified BR preferably has a tin atom content of 50 to 3,000 ppm. The tin-modified BR preferably has a molecular weight distribution (Mw/Mn) of 2 or less. The number average molecular weight (Mn) and weight average molecular weight (Mw) are determined by gel permeation chromatography (GPC) calibrated with polystyrene standards. Moreover, the tin-modified BR preferably has a vinyl content of 5% to 50% by mass. The vinyl content (1,2-butadiene unit content) can be measured by infrared absorption spectrometry.

The BR content based on 100% by mass of the rubber component is preferably 30% by mass or more, more preferably 35% by mass or more. The BR content is preferably 80% by mass or less, more preferably 75% by mass or less. With a BR content falling within the range indicated above, good abrasion resistance, durability, and crack growth resistance can be obtained while ensuring good handling stability, fuel economy, and elongation at break.

In the rubber composition of the present invention, the combined content of polybutadiene rubber, natural rubber, and polyisoprene rubber, preferably of polybutadiene rubber and natural rubber, based on 100% by mass of the rubber component is 90% by mass or more, preferably 95% by mass or more, and may be 100% by mass. In such cases, good handling stability, fuel economy, tensile strength, crack resistance, and ozone resistance can be obtained.

In addition to BR, NR, and IR, the rubber component may include any rubber material. Examples include diene rubbers such as styrene-butadiene rubber (SBR), styrene-isoprene-butadiene rubber (SIBR), chloroprene rubber (CR), acrylonitrile butadiene rubber (NBR), ethylene-propylene-diene rubber (EPDM), butyl rubber (IIR), and halogenated butyl rubber (X-IIR). These rubber materials may be used alone, or two or more of these may be used in combination.

The present invention involves the use of at least one nonionic surfactant selected from the group consisting of a Pluronic nonionic surfactant, and a nonionic surfactant represented by the formula (1) below and/or a nonionic surfactant represented by the formula (2) below.

Among the nonionic surfactants of formula (1) and/or (2), the nonionic surfactant of formula (2) is preferred in order to more suitably achieve the effects of the present invention, especially handling stability and ozone resistance.

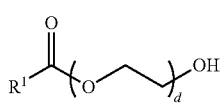
(1)

In formula (1), $R^1$ represents a C6-C26 hydrocarbon group having an unsaturated bond, and d represents an integer.

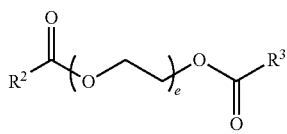
(2)

In formula (2), $R^2$ and $R^3$ are the same or different and each represent a C6-C26 hydrocarbon group, and e represents an integer.

$R^1$ in formula (1) represents a C6-C26 hydrocarbon group having an unsaturated bond. When $R^1$ is a hydrocarbon group having five or less carbon atoms, such a surfactant penetrates poorly into rubber and migrates too fast to the rubber surface, as a result of which the rubber surface tends to have poor appearance. Also, when $R^1$ is a hydrocarbon group having 27 or more carbon atoms, such a material is difficult to obtain or expensive and thus unsuitable. When the number of carbon atoms of the hydrocarbon group for $R^1$ falls within the range indicated above, blooming of the nonionic surfactant can be suitably controlled and the effects of the present invention can be more suitably achieved.

The hydrocarbon group for $R^1$ preferably has 8 to 24 carbon atoms, more preferably 10 to 22 carbon atoms, still more preferably 14 to 20 carbon atoms.

Examples of the C6-C26 hydrocarbon group having an unsaturated bond for $R^1$ include C6-C26 alkenyl groups and C6-C26 alkynyl groups.

Examples of C6-C26 alkenyl groups include 1-hexenyl, 2-hexenyl, 1-octenyl, decenyl, undecenyl, dodecenyl, tridecenyl, tetradecenyl, pentadecenyl, heptadecenyl, octadecenyl, icosenyl, tricosenyl, and hexacosenyl groups.

Examples of C6-C26 alkynyl groups include hexynyl, heptynyl, octynyl, nonynyl, decynyl, undecynyl, dodecynyl, tridecynyl, tetradecynyl, pentadecynyl, heptadecynyl, octadecynyl, icosynyl, tricosynyl, and hexacosynyl groups.

$R^1$ is preferably a C6-C26 alkenyl group.

A surfactant with a greater d (integer) has a higher value of HLB, which represents hydrophile-lipophile balance, and tends to migrate faster to the rubber surface. In the present invention, the d value is not particularly limited, and may be chosen appropriately according to the service conditions, purpose, or other factors. In particular, d is preferably 2 to 25, more preferably 4 to 20, still more preferably 8 to 16, particularly preferably 10 to 14.

Examples of the nonionic surfactant of formula (1) include ethylene glycol monooleate, ethylene glycol monopalmeate, ethylene glycol monovaccenate, ethylene glycol monolinoleate, ethylene glycol monolinolenate, ethylene glycol monoarachidonate, and ethylene glycol monocetylate. These may be used alone, or two or more of these may be used in combination. In view of ready availability or cost, ethylene glycol monooleate is preferred among these.

$R^2$ and $R^3$ in formula (2) are the same or different and each represent a C6-C26 hydrocarbon group. When $R^2$ or $R^3$ is a hydrocarbon group having five or less carbon atoms, such a surfactant penetrates poorly into rubber and migrates too fast to the rubber surface, as a result of which the rubber surface tends to have poor appearance. When $R^2$ or $R^3$ is a hydrocarbon group having 27 or more carbon atoms, such a material is difficult to obtain or expensive and thus unsuitable. When the number of carbon atoms of the hydrocarbon group for $R^2$ and $R^3$ falls within the range indicated above, blooming of the nonionic surfactant can be suitably controlled and the effects of the present invention can be more suitably achieved.

$R^2$ or $R^3$ is preferably a hydrocarbon group having 8 to 24 carbon atoms, more preferably 10 to 22 carbon atoms, still more preferably 14 to 20 carbon atoms.

Examples of the C6-C26 hydrocarbon group for $R^2$ or $R^3$ include C6-C26 alkenyl groups, C6-C26 alkynyl groups, and C6-C26 alkyl groups.

Examples of C6-C26 alkenyl groups and C6-C26 alkynyl groups include the same groups as mentioned for $R^1$.

Examples of C6-C26 alkyl groups include hexyl, heptyl, 2-ethylhexyl, octyl, nonyl, decyl, undecyl, dodecyl, tridecyl, tetradecyl, pentadecyl, octadecyl, heptadecyl, octadecyl, icosyl, tricosyl, and hexacosyl groups.

$R^2$ or $R^3$ is preferably a C6-C26 alkenyl group or a C6-C26 alkynyl group, more preferably a C6-C26 alkenyl group.

A surfactant with a greater e (integer) has a higher value of HLB, which represents hydrophile-lipophile balance, and tends to migrate faster to the rubber surface. In the present invention, the e value is not particularly limited, and may be chosen appropriately according to the service conditions, purpose, or other factors. In particular, e is preferably 2 to 25, more preferably 4 to 20, still more preferably 8 to 16, particularly preferably 10 to 14.

Examples of the nonionic surfactant of formula (2) include ethylene glycol dioleate, ethylene glycol dipalmeate, ethylene glycol dipalmitate, ethylene glycol divaccenate, ethylene glycol dilinoleate, ethylene glycol dilinolenate, ethylene glycol diarachidonate, ethylene glycol distearate, ethylene glycol dicetylate, and ethylene glycol dilaurate. These may be used alone, or two or more of these may be used in combination. In view of ready availability or cost, ethylene glycol dioleate, ethylene glycol dilaurate, ethylene glycol distearate, and ethylene glycol dipalmitate are preferred among these.

Pluronic nonionic surfactants are also called polyoxyethylene polyoxypropylene glycols, polyoxyethylene polyoxypropylene block polymers, or polypropylene glycol ethylene oxide adducts, as generally represented by the formula (I) below. As shown in formula (I), the Pluronic nonionic surfactants contain on both sides thereof a hydrophilic group having an ethylene oxide structure, and also contain a hydrophobic group having a propylene oxide structure between the hydrophilic groups.

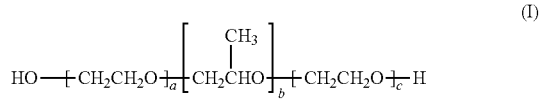
(I)

In formula (I), a, b, and c represent integers.

The degree of polymerization of the polypropylene oxide block (b in formula (I)) and the number of polyethylene oxide units added ((a+c) in formula (I)) in the Pluronic nonionic surfactant are not particularly limited, and may be chosen appropriately according to the service conditions, purpose, or other factors. A surfactant with a higher proportion of the polypropylene oxide block has higher affinity for rubber and tends to migrate to the rubber surface at a slower rate. In particular, in order to suitably control blooming of the nonionic surfactant and more suitably achieve the effects of the present invention, the degree of polymerization of the polypropylene oxide block (b in formula (I)) is preferably 100 or less, more preferably 10 to 70, still more preferably 10 to 60, particularly preferably 20 to 60, most preferably 20 to 45. For the same reason, the number of polyethylene oxide units added ((a+c) in formula (I)) is preferably 100 or less, more preferably 3 to 65, still more preferably 5 to 55, particularly preferably 5 to 40, most preferably 10 to 40. When the degree of polymerization of the polypropylene oxide block and the number of polyethylene oxide units added are within the respective ranges indicated above, blooming of the nonionic surfactant can be suitably controlled and the effects of the present invention can be more suitably achieved.

Examples of the Pluronic nonionic surfactant include Pluronic series available from BASF Japan Ltd., Newpol PE series available from Sanyo Chemical Industries, Ltd., Adeka Pluronic L or F series available from Adeka Corporation, Epan series available from DKS Co. Ltd., and Pronon series or UNILUB available from NOF corporation. These may be used alone, or two or more of these may be used in combination.

The combined amount of the nonionic surfactants of formula (1) and/or (2) and the Pluronic nonionic surfactant, per 100 parts by mass of the rubber component, is preferably 0.1 parts by mass or more, more preferably 0.2 parts by mass or more, still more preferably 0.5 parts by mass or more, particularly preferably 1.0 part by mass or more. With a combined amount of 0.1 parts by mass or more, the effect of preventing discoloration caused by antioxidants or waxes and the effect of imparting appropriate shine to the sidewall surface can be sufficiently achieved. The combined amount is also preferably 5.0 parts by mass or less, more preferably 4.0 parts by mass or less, still more preferably 3.0 parts by mass or less. With a combined amount of more than 5.0 parts by mass, the nonionic surfactants tend to excessively bloom and cause excessive shine, resulting in deterioration of appearance.

In the present invention, sulfur is used to produce moderate crosslinking between polymer chains. As a result, blooming of the nonionic surfactant can be suitably controlled and the effects of the present invention can be well achieved. Examples of the sulfur include those commonly used in the rubber industry, such as powdered sulfur, precipitated sulfur, colloidal sulfur, insoluble sulfur, highly dispersible sulfur, and soluble sulfur. These may be used alone, or two or more of these may be used in combination.

The amount of sulfur per 100 parts by mass of the rubber component is preferably 0.1 parts by mass or more, more preferably 0.5 parts by mass or more, still more preferably 1.0 part by mass or more. If it is less than 0.1 parts by mass, the effects of the present invention may not be sufficiently achieved. The amount of sulfur is preferably 6.0 parts by mass or less, more preferably 5.0 parts by mass or less, still more preferably 4.0 parts by mass or less, particularly preferably 3.0 parts by mass or less. If it is more than 6.0 parts by mass, handling stability, ozone resistance, discoloration resistance, or tire appearance may deteriorate.

In addition to sulfur, an alkylphenol-sulfur chloride condensate (e.g. Tackirol V200 available from Taoka Chemical Co., Ltd.) may be used as a vulcanizing agent in the present invention.

A specific amount of carbon black is used in the present invention. This provides good reinforcement to achieve good handling stability, crack resistance, and ozone resistance. The incorporation of a large amount of carbon black can deteriorate appearance. In the present invention, however, the deterioration of appearance can be reduced because the amount of carbon black is adjusted to a specific level. In addition, blooming of the nonionic surfactant can be suitably controlled and the effects of the present invention can be well achieved.

Specifically, the amount of carbon black per 100 parts by mass of the rubber component is 2 parts by mass or more, preferably 5 parts by mass or more, still more preferably 25 parts by mass or more. The use of less than 2 parts by mass of carbon black tends to provide insufficient reinforcement, resulting in deterioration of durability or handling stability. The amount of carbon black is 70 parts by mass or less, preferably 60 parts by mass or less, more preferably 50 parts by mass or less. The use of more than 70 parts by mass of carbon black may deteriorate fuel economy.

Any carbon black may be used including, for example, GPF, FEF, HAF, ISAF, and SAF. These may be used alone, or two or more of these may be used in combination.

The carbon black preferably has a nitrogen adsorption specific surface area ($N_2SA$) of 20 to 200 $m^2/g$, more preferably 30 to 60 $m^2/g$. If the $N_2SA$ is less than 20 $m^2/g$, durability or handling stability may decrease. If the $N_2SA$ is more than 200 $m^2/g$, sufficient fuel economy or processability may not be obtained. Herein, the nitrogen adsorption specific surface area of carbon black is determined in conformity with JIS K 6217-2:2001.

A specific amount of silica is used in the present invention. The combined use of the nonionic surfactant with a small amount of silica improves scorch resistance and tensile strength.

Specifically, the amount of silica per 100 parts by mass of the rubber component is 1 to 5 parts by mass. If it is less than 1 part by mass, the effect of reducing scorch or the effect of improving tensile strength may not be sufficiently achieved. An amount of more than 5 parts by mass tends to excessively increase scorch time (or weaken crosslinking), resulting in deterioration of vulcanizate properties.

Non-limiting examples of the silica include dry silica (anhydrous silicic acid) and wet silica (hydrous silicic acid). These may be used alone, or two or more of these may be used in combination. Preferred among these is wet silica because it has a large number of silanol groups.

The silica preferably has a nitrogen adsorption specific surface area ($N_2SA$) of 50 $m^2/g$ or more, more preferably 80 $m^2/g$ or more, still more preferably 150 $m^2/g$ or more. If the $N_2SA$ is less than 50 $m^2/g$, handling stability, crack resistance, or ozone resistance tends to decrease. The $N_2SA$ is preferably 280 $m^2/g$ or less, more preferably 240 $m^2/g$ or less. Silica having a $N_2SA$ of more than 280 $m^2/g$ is difficult to disperse, thereby resulting in deterioration of handing stability, crack resistance, or ozone resistance.

The $N_2SA$ of silica is determined according to the BET method specified in ASTM D3037-93.

The rubber composition of the present invention is free of silane coupling agents. The rubber composition containing a combination of the nonionic surfactant and a small amount of silica but containing no silane coupling agent achieves improved scorch resistance and tensile strength.

Examples of silane coupling agents include various silane coupling agents conventionally used in combination with silica in the rubber industry. Specific examples include sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropylbenzothiazolyl tetrasulfide, 3-triethoxysilylpropylbenzothiazole tetrasulfide, 3-triethoxysilylpropyl methacrylate monosulfide, and 3-trimethoxysilylpropyl methacrylate monosulfide; mercapto silane coupling agents such as 3-mercaptopropyltrimethoxysilane, 3-mercaptopropyltriethoxysilane, 2-mercaptoethyltrimethoxysilane, and 2-mercaptoethyltriethoxysilane; vinyl silane coupling agents such as vinyltriethoxysilane and vinyltrimethoxysilane; amino silane coupling agents such as 3-aminopropyltriethoxysilane, 3-aminopropyltrimethoxysilane, 3-(2-aminoethyl)aminopropyltriethoxysilane, and 3-(2-aminoethyl)aminopropyltrimethoxysilane; glycidoxy silane coupling agents such as γ-glycidoxypropyltriethoxysilane, γ-glycidoxypropyltrimethoxysilane, γ-glycidoxypropylmethyldiethoxysilane, and γ-glycidoxypropylmethyldimethoxysilane; nitro silane coupling agents such as 3-nitropropyltrimethoxysilane and 3-nitropropyltriethoxysilane; and chloro silane coupling agents such as 3-chloropropyltrimethoxysilane, 3-chloropropyltriethoxysilane, 2-chloroethyltrimethoxysilane, and 2-chloroethyltriethoxysilane.

In the present invention, a wax is preferably incorporated to reduce the formation and growth of cracks due to ozone. In the present invention, even when a wax is incorporated, the irregularities formed on the tire surface (bloom layer) by blooming of waxes and other agents can be flattened to reduce diffused reflection of light. This results in decreases in the brown discoloration and white discoloration described earlier. Moreover, improved tire appearance is obtained, such as appropriate black appearance and shine imparted to the tire surface. Furthermore, in the specific rubber composition of the present invention, good handling stability, crack resistance, and ozone resistance are maintained or improved.

Non-limiting examples of the wax include petroleum-derived waxes and natural waxes. Synthetic waxes obtained by purification or chemical treatment of a plurality of waxes may also be used. These waxes may be used alone, or two or more these may be used in combination.

Examples of petroleum-derived waxes include paraffin wax and microcrystalline wax. The natural wax may be any wax derived from non-petroleum resources, including, for example: vegetable waxes such as candelilla wax, carnauba wax, Japan wax, rice wax, and jojoba wax; animal waxes such as beeswax, lanolin, and spermaceti; mineral waxes such as ozokerite, ceresin, and petrolatum; and purified products of the foregoing waxes.

In the case of the rubber composition containing a wax, the amount of the wax per 100 parts by mass of the rubber component is preferably 0.3 parts by mass or more, more preferably 0.5 parts by mass or more. An amount of less than 0.3 parts by mass may not provide sufficient ozone resistance. The amount of the wax is also preferably 6.0 parts by mass or less, more preferably 4.0 parts by mass or less. An amount exceeding 6.0 parts by mass may not be expected to have a larger effect in improving ozone resistance, but may increase the cost.

The rubber composition of the present invention may contain an oil. The incorporation of an oil improves processability and imparts flexibility to tires, thereby allowing the effects of the present invention to be better achieved. Examples of the oil include process oils, vegetable oils and fats, and mixtures thereof. Examples of process oils include paraffinic process oils, aromatic process oils, and naphthenic process oils. Specific examples of paraffinic process oils include PW-32, PW-90, PW-150, and PS-32 all available from Idemitsu Kosan Co., Ltd. Specific examples of aromatic process oils include AC-12, AC-460, AH-16, AH-24, and AH-58 all available from Idemitsu Kosan Co., Ltd. Examples of vegetable oils and fats include castor oil, cottonseed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil. These may be used alone, or two or more of these may be used in combination. Preferred among these are paraffinic process oils because the effects of the present invention can be suitably achieved.

In the case of the rubber composition containing an oil, the amount of the oil per 100 parts by mass of the rubber component is preferably 0.5 parts by mass or more, more preferably 2.0 parts by mass or more. The amount of the oil is also preferably 60 parts by mass or less, more preferably 15 parts by mass or less, still more preferably 10 parts by mass or less. When the amount of the oil, which itself blooms to the tire surface, is within the range indicated above, blooming of the nonionic surfactant can be suitably controlled and the effects of the present invention can be more suitably achieved. It should be noted that if the amount of the oil is more than 60 parts by mass, fuel economy tends to deteriorate.

The rubber composition of the present invention preferably contains an antioxidant to reduce the formation and growth of cracks due to ozone. As described earlier, the rubber composition of the present invention, even containing an antioxidant, can reduce brown discoloration and white discoloration while maintaining or improving good fuel economy and good abrasion resistance, thereby improving discoloration resistance and tire appearance.

Any antioxidant may be used but it is preferably an amine antioxidant, especially preferably a p-phenylenediamine antioxidant, because it has better ozone resistance so that the effects of the present invention can be more suitably achieved.

Examples of the p-phenylenediamine antioxidant include N-(1,3-dimethylbutyl)-N'-phenyl-p-phenylenediamine, N-isopropyl-N'-phenyl-p-phenylenediamine, N-1,4-dimethylpentyl-N'-phenyl-p-phenylenediamine, N,N'-diphenyl-p-phenylenediamine, N,N'-di-2-naphthyl-p-phenylenediamine, N-cyclohexyl-N'-phenyl-p-phenylenediamine, N,N'-bis(1-methylheptyl)-p-phenylenediamine, N,N'-bis(1,4-dimethylpentyl)-p-phenylenediamine, N,N'-bis(1-ethyl-3- methylpentyl)-p-phenylenediamine, N-4-methyl-2-pentyl-N'-phenyl-p-phenylenediamine, N,N'-diaryl-p-phenylenediamines, hindered diaryl-p-phenylenediamines, phenylhexyl-p-phenylenediamine, and phenyloctyl-p-phenylenediamine. These may be used alone, or two or more of these may be used in combination. Among these, N-(1,3-dimethylbutyl)-N'-phenyl-p-phenylenediamine is preferred because it has better ozone resistance so that the effects of the present invention can be more suitably achieved, and it is also excellent in cost efficiency.

In the case of the rubber composition containing an antioxidant, the amount of the antioxidant per 100 parts by mass of the rubber component is preferably 0.1 parts by mass or more, more preferably 0.5 parts by mass or more, still more preferably 1.0 part by mass or more. An amount of less than 0.1 parts by mass may not provide sufficient ozone resistance. The amount of the antioxidant is preferably 3.0 parts by mass or less, more preferably 2.5 parts by mass or less. When it is more than 3.0 parts by mass, a larger amount of the antioxidant may bloom, resulting in deterioration of tire appearance.

The rubber composition of the present invention preferably contains a vulcanization accelerator. Any type of vulcanization accelerator may be used including usually used ones. Examples of the vulcanization accelerator include sulfenamide vulcanization accelerators, thiazole vulcanization accelerators, thiuram vulcanization accelerators, thiourea vulcanization accelerators, guanidine vulcanization accelerators, dithiocarbamate vulcanization accelerators, aldehyde-amine or aldehyde-ammonia vulcanization accelerators, imidazoline vulcanization accelerators, and xanthate vulcanization accelerators. These vulcanization accelerators may be used alone, or two or more of these may be used in combination.

Examples of sulfenamide vulcanization accelerators that can be suitably used in the present invention include N-tert-butyl-2-benzothiazolylsulfenamide (TBBS), N-cyclohexyl-2-benzothiazolylsulfenamide (CBS), and N,N-dicyclohexyl-2-benzothiazolylsulfenamide (DCBS). These may be used alone, or two or more of these may be used in combination. It should be noted that the amount of the vulcanization accelerator is not particularly limited, and may be chosen appropriately depending on the desired cure rate or crosslink density.

In addition to the above-described components, the rubber composition of the present invention may appropriately contain other compounding agents usually used to produce rubber compositions, such as zinc oxide, stearic acid, or tackifiers.

The rubber composition of the present invention can be prepared by known methods such as by kneading the above components using a rubber kneading machine such as an open roll mill or Banbury mixer, followed by vulcanization.

The rubber composition of the present invention can be suitably used in tire components, particularly, for example, sidewalls, clinches, and/or wings which form tire (outer) surfaces requiring good ozone resistance, discoloration resistance, and tire appearance.

A sidewall refers to a component located outside a carcass and extending from a shoulder portion to a bead portion. Specifically, it is a component as shown in, for example, FIG. 1 of JP 2005-280612 A and FIG. 1 of JP 2000-185529 A.

A clinch refers to a rubber portion located at a lower part of a sidewall and covering a portion to be in contact with a rim, and is also called a clinch apex or a rubber chafer. Specifically, it is a component as shown in, for example, FIG. 1 of JP 2008-75066 A.

A wing refers to a component located at a shoulder portion between a tread and a sidewall. Specifically, it is a component as shown in, for example, FIGS. 1 and 3 of JP 2007-176267 A.

The pneumatic tire of the present invention can be formed from the rubber composition by usual methods.

Specifically, an unvulcanized rubber composition containing the above-described components is extruded and processed into the shape of a sidewall, a clinch, a wing, or other components, and then assembled with other tire components in a usual manner on a tire building machine to build an unvulcanized tire. The unvulcanized tire is heated and pressurized in a vulcanizer to produce a tire.

The pneumatic tire of the present invention can be used as, for example, a tire for passenger vehicles, a tire for trucks and buses, a tire for two-wheeled vehicles, or a high performance tire. The term "high performance tire" herein refers to a tire excellent particularly in grip performance, and conceptually includes racing tires for use in racing vehicles.

EXAMPLES

The present invention will be specifically described with reference to, but not limited to, examples.

The chemicals used in examples and comparative examples are listed below.

NR: RSS#3

BR 1: BR1250H (tin-modified BR polymerized using a lithium initiator, vinyl content: 10% to 13% by mass, Mw/Mn: 1.5, tin atom content: 250 ppm) available from Zeon Corporation BR 2: VCR617 (SPB-containing BR, SPB content: 17% by mass, melting point of SPB: 200° C.) available from Ube Industries, Ltd.

BR 3: BR150B (cis content: 97% by mass) available from Ube Industries, Ltd.

Carbon black 1: SHOBLACK N220 ($N_2SA$: 111 $m^2/g$) available from Cabot Japan K.K.

Carbon black 2: SHOBLACK N550 ($N_2SA$: 42 $m^2/g$) available from Cabot Japan K.K.

Silica: ULTRASIL VN3 ($N_2SA$: 175 $m^2/g$) available from Evonik Degussa

Wax: SUNNOC WAX available from Ouchi Shinko Chemical Industrial Co., Ltd.

Oil: Process oil PW-32 (paraffinic process oil) available from Idemitsu Kosan Co., Ltd.

Surfactant 1: Ionet DO600 (main ingredient: a compound of formula (2) in which each of $R^2$ and $R^3$ is —$C_{17}H_{33}$, and e is 12) available from Sanyo Chemical Industries, Ltd.

Surfactant 2: Ionet PO600 (main ingredient: a compound of formula (1) in which $R^1$ is —$C_{17}H_{33}$, and d is 12) available from Sanyo Chemical Industries, Ltd.

Surfactant 3: Newpol PE-64 (a Pluronic nonionic surfactant (PEG/PPG-25/30 copolymer) of formula (I) in which a+c is 25, and b is 30) available from Sanyo Chemical Industries, Ltd.

Surfactant 4: Newpol PE-74 (a Pluronic nonionic surfactant (PEG/PPG-30/35 copolymer) of formula (I) in which a+c is 30, and b is 35) available from Sanyo Chemical Industries, Ltd.

Surfactant 5: polyoxyethylene sorbitan monostearate available from Kanto Chemical Co., Inc.

Surfactant 6: polyoxyethylene sorbitan trioleate available from Kanto Chemical Co., Inc.

Surfactant 7: polyoxyethylene dodecyl ether available from Kanto Chemical Co., Inc.

Surfactant 8: ethylene glycol dibutyl ether available from Tokyo Chemical Industry Co., Ltd.

Antioxidant 1: Nocrac 6C (N-(1,3-dimethylbutyl)-N'-phenyl-p-phenylenediamine) available from Ouchi Shinko Chemical Industrial Co., Ltd.

Stearic acid: stearic acid available from NOF Corporation

Sulfur: powdered sulfur available from Tsurumi Chemical Industry Co., Ltd.

V200: Tackirol V200 (alkylphenol-sulfur chloride condensate) available from Taoka Chemical Co., Ltd.

Zinc oxide: Zinc oxide #1 available from Mitsui Mining & Smelting Co., Ltd.

Vulcanization accelerator: Nocceler NS (N-tert-butyl-2-benzothiazolylsulfenamide) available from Ouchi Shinko Chemical Industrial Co., Ltd.

According to each of the formulations shown in Tables 1 and 2, the chemicals other than the sulfur, V200, and vulcanization accelerator were kneaded using a 1.7 L Banbury mixer until the temperature of the mixture reached 180° C. Next, the kneaded mixture was kneaded with the sulfur, V200, and vulcanization accelerator using an open roll mill until the temperature of the mixture reached 105° C. to obtain an unvulcanized rubber composition. The unvulcanized rubber composition was then press-vulcanized at 160° C. for 15 minutes to obtain a vulcanized rubber composition.

The vulcanized rubber compositions prepared as above were evaluated as described below. Tables 1 and 2 show the results. It should be noted that Comparative Examples 1 and 16 are taken as the reference comparative examples in Tables 1 and 2, respectively.

<Scorch Time>

The scorch time (t10) at 130° C. of each unvulcanized rubber composition was measured in conformity with JIS K 6300. The results are expressed as an index using the equation below, with the reference comparative example set equal to 100. A higher index indicates a longer scorch time. The target index is at least 100 but less than 120.

(Scorch time index)=(Scorch time of reference comparative example)/(Scorch time of each formulation example)×100

<Measurement of Hardness>

The hardness of each vulcanized rubber composition was measured at 25° C. using a durometer in conformity with JIS K 6253 (Shore A measurement), and expressed as an index calculated according to the formula: (hardness of each formulation example)/(hardness of reference comparative example)×100, with the reference comparative example set equal to 100 or 92. A higher index indicates better handling stability. The target hardness index is 90 or more.

<Elongation at Break>

No. 3 dumbbell-shaped test pieces prepared from each vulcanized rubber composition were subjected to a tensile test at room temperature in conformity with JIS K 6251 "Rubber, vulcanized or thermoplastics—Determination of tensile stress-strain properties," to measure elongation at break, EB (%). The EB values are expressed as an index calculated according to the formula: (EB of each formulation example)/(EB of reference comparative example)×100, with the reference comparative example set equal to 100. A higher index indicates better tensile strength. The target EB index is 100 or more.

<Fuel Economy>

The tan δ of specimens prepared from each vulcanized rubber composition was measured using a viscoelastic spectrometer VES (available from Iwamoto Seisakusho Co., Ltd.) at a temperature of 70° C., an initial strain of 10%, and a dynamic strain of ±1%, and expressed as an index using the equation below, with the reference comparative example set equal to 100. A lower index indicates better rolling resistance properties (better fuel economy). The target rolling resistance index is 102 or less.

(Rolling resistance index)=(tan δ of each formulation example)/(tan δ of reference comparative example)×100

<Evaluation of Ozone Resistance>

Test pieces with a predetermined size were prepared from each of the prepared vulcanized rubber compositions and subjected to a dynamic ozone deterioration test in conformity with JIS K 6259 "Rubber, vulcanized or thermoplastics—Determination of ozone resistance". The test was carried out for 48 hours at a frequency of reciprocation of 0.5±0.025 Hz, an ozone concentration of 50±5 pphm, a test temperature of 40° C., and a tensile strain of 20±2%. After the test, crack conditions (the presence or absence of cracks) were analyzed to evaluate ozone resistance. The evaluation was carried out in conformity with JIS K 6259, and an index of ozone resistance was calculated from the number and size of cracks, with the reference comparative example set equal to 100. A higher index indicates a smaller number of cracks and a smaller size of crack, and therefore better ozone resistance. The target ozone resistance index is 98 or more.

<Evaluation of Discoloration Resistance>

The samples after the ozone resistance test were analyzed with a chromameter (CR-310 available from Konica Minolta, Inc.) to determine "a" and "b" values (L*a*b* color system). The value of $(a^2+b^2)^{-0.5}$ was used as a parameter and expressed as an index calculated from the formula: (parameter of each formulation example)/(parameter of reference comparative example)×100, with the reference comparative example set equal to 100. A higher index indicates less discoloration and therefore better discoloration resistance. The target discoloration resistance index is 100 or more.

<Evaluation of Appearance>

The appearance of the samples after the ozone resistance test was evaluated in an open air based on the following criteria.

AA: Darker black than reference comparative example and shiny

A: Darker black than reference comparative example and slightly shiny

B: Similar shade of brown as reference comparative example

C: Darker brown than reference comparative example

TABLE 1

| | Example | | | | | | | | | Comparative Example | | | | | | | | | | | | | | |
|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 1 | 2 | 3 | 4 | 5 | 6 | 7 | 8 | 9 | 10 | 11 | 12 | 13 | 14 | 15 |
| NR (RSS#3) | 40 | 40 | 40 | 40 | 40 | 40 | 40 | 40 | 40 | 40 | 40 | 40 | 40 | 40 | 40 | 40 | 40 | 40 | 40 | 40 | 40 | 40 | 40 | 40 |
| BR 1 (BR1250H) | 30 | 30 | 30 | 30 | 30 | 30 | 30 | 30 | 30 | 30 | 30 | 30 | 30 | 30 | 30 | 30 | 30 | 30 | 30 | 30 | 30 | 30 | 30 | 20 |
| BR 2 (VCR617) | 30 | 30 | 30 | 30 | 30 | 30 | 30 | 30 | 30 | 30 | 30 | 30 | 30 | 30 | 30 | 30 | 30 | 30 | 30 | 30 | 30 | 30 | 30 | 15 |
| BR 3 (BR150B) | | | | | | | | | | | | | | | | | | | | | | | | 25 |
| Carbon black 1 (N220 BET111) | 40 | 40 | 40 | 40 | 40 | | | | | 40 | 40 | 40 | 40 | 40 | 40 | 40 | 40 | 40 | 40 | 40 | 40 | 40 | 40 | 40 |
| Carbon black 2 (N550 BET42) | | | | | | 10 | | | | | | | | | | | 10 | | | | | | | |
| Silica (VN3 BET175) | | | | | | 20 | 40 | 40 | 40 | | | | | | | | 20 | | | | | | | |
| Wax | 1.5 | 1.5 | 1.5 | 1.5 | 1.5 | 1 | 1 | 1 | 1 | 1.5 | 1.5 | 1.5 | 1.5 | 1.5 | 1.5 | 1.5 | 1 | 1.5 | 1.5 | 1.5 | 1.5 | 1.5 | 3.5 | 3.5 |
| Oil | 7.5 | 6.5 | 3.5 | 6.5 | 6.5 | 1.5 | 6.5 | 6.5 | 6.5 | 8.0 | 7.9 | 6.5 | 3.5 | 6.5 | 6.5 | 6.5 | 6.5 | 6.0 | 6.0 | 6.0 | 6.0 | 2.0 | 25.0 | 6.5 |
| Surfactant 1 (Ionet DO600) (polyoxyethylene sorbitan monostearate) | 0.5 | 1.5 | 4.5 | 1.5 | 1.5 | | | | | | 0.1 | 1.5 | 4.5 | | | | | | | | | | 1.5 | 1.5 |
| Surfactant 2 (Ionet PO600) (polyoxyethylene sorbitan trioleate) | | | | | | 1.5 | | | | | | | | 1.5 | | | | | | | | | | |
| Surfactant 3 (Newpol PE64) | | | | | | | 1.5 | | | | | | | | 1.5 | | | | | | | | | |
| Surfactant 4 (Newpol PE74) | | | | | | | | 1.5 | | | | | | | | 1.5 | | | | | | | | |
| Surfactant 5 | | | | | | | | | 1.5 | | | | | | | | 1.5 | | | | | | | |
| Surfactant 6 | | | | | | | | | | | | | | | | | | 1.5 | | | | | | |
| Surfactant 7 (polyoxyethylene dodecyl ether) | | | | | | | | | | | | | | | | | | | | 1.5 | | | | |
| Surfactant 8 (ethylene glycol dibutyl ether) | | | | | | | | | | | | | | | | | | | | | 1.5 | | | |
| Antioxidant 1 (Nocrac 6C) | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Stearic acid | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Sulfur (powdered sulfur) V200 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Zinc oxide (Zinc oxide #1) | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| Vulcanization accelerator (Noccler NS) | 1.0 | 1.0 | 1.0 | 1.0 | 1.0 | 0.5 | 1.0 | 1.0 | 1.0 | 1.0 | 1.0 | 1.0 | 1.0 | 1.0 | 1.0 | 1.0 | 0.5 | 1.0 | 1.0 | 1.0 | 1.0 | 1.0 | 1.0 | 1.0 |
| Scorch time index (Target: at least 100 but less than 120) | 102 | 105 | 101 | 105 | 110 | 103 | 104 | 103 | 103 | 100 | 100 | 90 | 80 | 90 | 90 | 90 | 120 | 80 | 80 | 80 | 80 | 75 | 92 | 85 |
| Hardness index (Target: 90 or more) | 100 | 100 | 103 | 101 | 98 | 101 | 100 | 99 | 101 | 100 | 100 | 102 | 103 | 101 | 102 | 100 | 90 | 100 | 100 | 98 | 98 | 97 | 98 | 105 |
| EB index (Target: 100 or more) | 100 | 105 | 102 | 110 | 115 | 110 | 104 | 104 | 103 | 100 | 100 | 99 | 98 | 99 | 99 | 99 | 125 | 96 | 96 | 97 | 95 | 94 | 100 | 96 |
| Rolling resistance index (Target: 102 or less) | 100 | 100 | 101 | 101 | 102 | 99 | 101 | 102 | 100 | 100 | 100 | 100 | 101 | 100 | 100 | 100 | 105 | 101 | 102 | 100 | 101 | 103 | 110 | 104 |
| Ozone resistance (Target: 98 or more) | 100 | 100 | 103 | 100 | 100 | 100 | 99 | 98 | 98 | 100 | 100 | 102 | 103 | 101 | 102 | 101 | 100 | 99 | 99 | 98 | 98 | 100 | 96 | 98 |
| Discoloration resistance (Target: 100 or more) | 101 | 106 | 110 | 104 | 106 | 105 | 105 | 105 | 102 | 100 | 101 | 107 | 110 | 108 | 109 | 109 | 105 | 102 | 102 | 101 | 101 | 105 | 99 | 102 |
| Appearance | A | AA | AA | AA | A | AA | A | A | A | B | B | A | AA | A | AA | AA | A | A | A | A | A | AA | B | B |

|  | Example | | | | | Comparative Example | |
| --- | --- | --- | --- | --- | --- | --- | --- |
|  | 10 | 11 | 12 | 13 | 14 | 16 | 17 |
| NR (RSS#3) | 40 | 40 | 40 | 40 | 40 | 40 | 40 |
| BR 1 (BR1250H) |  |  |  |  |  |  |  |
| BR 2 (VCR617) | 10 | 5 | 10 |  |  |  |  |
| BR 3 (BR150B) | 50 | 55 | 50 | 60 | 60 | 60 | 60 |
| Carbon black 1 (N220 BET111) | 10 | 10 | 10 |  |  |  |  |
| Carbon black 2 (N550 BET42) | 20 | 20 | 20 | 50 | 50 | 50 | 50 |
| Silica (VN3 BET175) | 1 | 1 | 1 | 1 | 1 |  |  |
| Wax | 1.5 | 1.5 | 1.5 | 1.5 | 1.5 | 1.5 | 1.5 |
| Oil | 6.5 | 6.5 | 6.5 | 6.5 | 6.5 | 8.0 | 8.0 |
| Surfactant 1 (Ionet DO600) |  |  |  |  |  |  |  |
| Surfactant 2 (Ionet PO600) |  |  |  |  |  |  |  |
| Surfactant 3 (Newpol PE64) | 1.5 | 1.5 | 1.5 | 1.5 | 1.5 |  |  |
| Surfactant 4 (Newpol PE74) |  |  |  |  |  |  |  |
| Surfactant 5 (polyoxyethyleno sorbitan monostearate) |  |  |  |  |  |  |  |
| Surfactant 6 (polyoxyethylene sorbitan trioleate) |  |  |  |  |  |  |  |
| Surfactant 7 (polyoxyethylene dodecyl ether) |  |  |  |  |  |  |  |
| Surfactant 8 (ethylene glycol dibutyl ether) |  |  |  |  |  |  |  |
| Antioxidant 1 (Nocrac 6C) | 2.0 | 2.0 | 2.0 | 2.0 | 2.0 | 2.0 | 2.0 |
| Stearic acid | 1.0 | 1.0 | 1.0 | 1.0 | 1.0 | 1.0 | 1.0 |
| Sulfur (powdered sulfur) | 1.5 | 2.0 | 1.0 | 2.0 | 2.2 | 2.0 | 2.0 |
| V200 | 0.5 | 0.5 | 1.0 | 1.0 |  | 1.0 | 1.0 |
| Zinc oxide (Zinc oxide #1) | 4.0 | 4.0 | 4.0 | 4.0 | 4.0 | 4.0 | 4.0 |
| Vulcanization accelerator (Nocceler NS) | 1.0 | 1.0 | 1.0 | 1.0 | 1.0 | 1.0 | 1.0 |
| Scorch time index (Target: at least 100 but less than 120) | 104 | 108 | 101 | 100 | 105 | 100 | 110 |
| Hardness index (Target 90 or more) | 90 | 95 | 93 | 92 | 90 | 92 | 90 |
| EB index (Target: 100 or more) | 100 | 101 | 101 | 105 | 103 | 100 | 98 |
| Rolling resistance index (Target: 102 or less) | 85 | 80 | 78 | 88 | 100 | 100 | 110 |
| Ozone resistance (Target: 98 or more) | 100 | 105 | 105 | 100 | 100 | 100 | 100 |
| Discoloration resistance (Target: 100 or more) | 105 | 106 | 106 | 100 | 100 | 100 | 100 |
| Appearance | A | A | A | A | A | B | B |

The balance of handling stability, crack resistance, ozone resistance, discoloration resistance, tire appearance, fuel economy, tensile strength (EB), and scorch resistance was significantly improved in the examples in each of which the rubber composition contained a rubber component having a combined content of polybutadiene rubber, natural rubber, and polyisoprene rubber of 90% by mass or more, sulfur, a specific nonionic surfactant, and specific amounts of carbon black and silica, but was free of silane coupling agents.

Then, such a rubber composition containing a specific rubber component, a specific amount of carbon black, and sulfur and further containing a specific nonionic surfactant and a small amount of silica without silane coupling agents was used in a sidewall to produce a tire. This tire exhibited an improved balance of the above-mentioned properties. Also in the case of carbon black-containing formulations usually used for clinches or wings, the same effect as above was exhibited when a clinch or wing was produced from a rubber composition containing a specific rubber component, a specific amount of carbon black, sulfur, a specific nonionic surfactant, and a small amount of silica without silane coupling agents.

The invention claimed is:

1. A rubber composition for tires, comprising:
   a rubber component having a combined content of polybutadiene rubber, natural rubber, and polyisoprene rubber of 90% by mass or more based on 100% by mass of the rubber component;
   sulfur; and
   paraffinic process oil; and
   at least one nonionic surfactant selected from the group comprising
   (a) a poloxamer nonionic surfactant represented by the formula (I) below,
   (b) a nonionic surfactant represented by the formula (1) below, and
   (c) a nonionic surfactant represented by the formula (2) below,
   the rubber composition comprising, per 100 parts by mass of the rubber component,
   2 to 70 parts by mass of carbon black and
   1 to 5 parts by mass of silica, and
   being free of silane coupling agents,

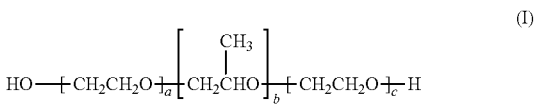

(I)

wherein a, b and c are integers, b is 20 to 70, and a+c is 3 to 65,

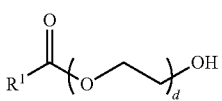

(1)

wherein $R^1$ represents a C6-C26 hydrocarbon group having an unsaturated bond, and d represents an integer,

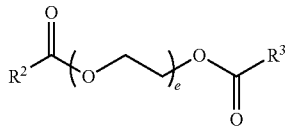
(2)

wherein $R^2$ and $R^3$ are the same or different and each represent a C6-C26 hydrocarbon group, and e represents an integer.

2. The rubber composition for tires according to claim 1, wherein the rubber composition comprises the nonionic surfactant in an amount of 0.1 to 5.0 parts by mass per 100 parts by mass of the rubber component.

3. The rubber composition for tires according to claim 1, wherein the rubber composition comprises the sulfur in an amount of 0.1 to 6.0 parts by mass per 100 parts by mass of the rubber component.

4. The rubber composition for tires according to claim 1, wherein the rubber component comprises the polybutadiene rubber in an amount of 30% by mass or more based on 100% by mass of the rubber component.

5. The rubber composition for tires according to claim 1, wherein the rubber composition is for use as at least one of rubber compositions for sidewalls, clinches, or wings.

6. The rubber composition for tires according to claim 1, wherein the rubber composition comprises the sulfur in an amount of 2.0 to 6.0 parts by mass per 100 parts by mass of the rubber component.

7. The rubber composition for tires according to claim 6, wherein the rubber composition comprises wax in an amount of 0.3 to 1.5 parts by mass per 100 parts by mass of the rubber component.

8. The rubber composition for tires according to claim 7, wherein the rubber composition comprises the paraffinic process oil in an amount of 3.5 to 7.5 parts by mass per 100 parts by mass of the rubber component.

9. The rubber composition for tires according to claim 1, wherein the rubber composition comprises wax in an amount of 0.3 to 1.5 parts by mass per 100 parts by mass of the rubber component.

10. The rubber composition for tires according to claim 1, wherein the rubber composition comprises the paraffinic process oil in an amount of 3.5 to 7.5 parts by mass per 100 parts by mass of the rubber component.

11. The rubber composition for tires according to claim 1, wherein the at least one nonionic surfactant is selected from the nonionic surfactant represented by formula (1) and/or the nonionic surfactant represented by formula (2).

12. The rubber composition for tires according to claim 1, wherein the at least one nonionic surfactant is the nonionic surfactant represented by formula (I).

13. The rubber composition for tires according to claim 1, wherein
the polybutadiene rubber comprises SPB-containing BR and tin-modified BR, and
the rubber component comprises the polybutadiene rubber in an amount of 60% by mass to 80% by mass based on 100% by mass of the rubber component.

14. The rubber composition for tires according to claim 1, wherein the rubber composition further comprises an alkylphenol-sulfur chloride condensate as a vulcanizing agent.

15. A pneumatic tire, comprising a tire component formed from the rubber composition according to claim 1.

16. The pneumatic tire according to claim 15, wherein the tire component is at least one of a sidewall, a clinch, or a wing.

* * * * *